United States Patent
Lee et al.

(10) Patent No.: US 11,799,253 B2
(45) Date of Patent: Oct. 24, 2023

(54) ELECTRONIC APPARATUS FOR SUPPORTING HIGH-SPEED CHARGING AND AUDIO SIGNAL TRANSMISSION/RECEPTION FUNCTIONS

(71) Applicant: Samsung Electronics Co., Ltd., Gyeonggi-do (KR)

(72) Inventors: Wonwook Lee, Gyeonggi-do (KR); Bangmin Kim, Gyeonggi-do (KR); Sanghyuk Park, Gyeonggi-do (KR); Changi Park, Gyeonggi-do (KR); Junho Son, Gyeonggi-do (KR); Dongju Yeon, Gyeonggi-do (KR); Jonghee Ham, Gyeonggi-do (KR)

(73) Assignee: Samsung Electronics Co., Ltd

( * ) Notice: Subject to any disclaimer, the term of this patent is extended or adjusted under 35 U.S.C. 154(b) by 205 days.

(21) Appl. No.: 17/293,766

(22) PCT Filed: Nov. 25, 2019

(86) PCT No.: PCT/KR2019/016223
§ 371 (c)(1),
(2) Date: May 13, 2021

(87) PCT Pub. No.: WO2020/111685
PCT Pub. Date: Jun. 4, 2020

(65) Prior Publication Data
US 2022/0013968 A1    Jan. 13, 2022

(30) Foreign Application Priority Data

Nov. 26, 2018  (KR) ........................ 10-2018-0147407

(51) Int. Cl.
*H01R 13/62*    (2006.01)
*H01R 27/02*    (2006.01)
(Continued)

(52) U.S. Cl.
CPC ............. *H01R 27/02* (2013.01); *G06F 3/162* (2013.01); *H01R 24/64* (2013.01); *H02J 7/00034* (2020.01)

(58) Field of Classification Search
CPC ..... H01R 24/64; H01R 27/02; H02J 7/00034; G06F 3/162
(Continued)

(56) References Cited

U.S. PATENT DOCUMENTS 6,146,206 A  *  11/2000  Konno ................... H01R 13/68
                                                          439/924.2
7,064,720 B2      6/2006  Yoshino
(Continued)

FOREIGN PATENT DOCUMENTS

KR    10-2007-0006078    1/2007
KR    10-2018-0045416    5/2018
(Continued)

OTHER PUBLICATIONS

PCT/ISA/210 Search Report issued on PCT/KR2019/016223, dated Mar. 6, 2020, pp. 5.
(Continued)

*Primary Examiner* — Abdullah A Riyami
*Assistant Examiner* — Vladimir Imas
(74) *Attorney, Agent, or Firm* — The Farrell Law Firm, P.C.

(57) ABSTRACT

An electronic apparatus according to various embodiments comprises: a receptacle including a plurality of GND pins, a first CC pin, and a second CC pin and to which a first USB-type plug is insertable; and at least one processor, wherein the at least one processor is configured to: determine whether an external apparatus is connected and the external apparatus supports high-speed charging, by using at least one of the first CC pin and the second CC pin;
(Continued)

determine whether the external apparatus supports an audio signal output, by using at least one of the plurality of GND pins, when the external apparatus is determined to support the high-speed charging; and transmit and receive at least one of data or electricity to and from the external apparatus, on the basis of whether the external apparatus supports the high-speed charging and the audio signal output. In addition, other embodiments are possible.

17 Claims, 7 Drawing Sheets

(51) Int. Cl.
*H02J 7/00* (2006.01)
*G06F 3/16* (2006.01)
*H01R 24/64* (2011.01)

(58) Field of Classification Search
USPC .......................................................... 439/300
See application file for complete search history.

(56) References Cited

U.S. PATENT DOCUMENTS

| | | | |
|---|---|---|---|
| 7,825,717 B2 | 11/2010 | Kim | |
| 8,683,090 B2* | 3/2014 | Mullins | H02H 9/02 |
| | | | 710/16 |
| 10,088,515 B2* | 10/2018 | Kim | G01R 31/69 |
| 10,186,815 B2* | 1/2019 | Shen | H02H 3/20 |
| 10,261,934 B2* | 4/2019 | Lim | G06F 13/385 |
| 10,283,920 B2 | 5/2019 | Chung | |
| 10,310,576 B2* | 6/2019 | Ueki | G06F 1/266 |
| 10,353,842 B2 | 7/2019 | Gagne-Keats et al. | |
| 10,483,599 B2* | 11/2019 | McSweyn | H01M 10/46 |
| 10,511,703 B2* | 12/2019 | Park | H04M 19/08 |
| 10,707,688 B2* | 7/2020 | Kang | H01R 31/065 |
| 10,797,476 B2* | 10/2020 | Elberbaum | H01R 25/162 |
| 10,841,685 B2 | 11/2020 | Yoshino et al. | |
| 10,992,163 B2* | 4/2021 | Lee | H04M 1/02 |
| 11,489,345 B2* | 11/2022 | Wang | H02J 7/0045 |
| 2007/0009183 A1 | 1/2007 | Kim | |
| 2008/0248672 A1* | 10/2008 | Yip | H01R 27/02 |
| | | | 439/300 |
| 2012/0049789 A1 | 3/2012 | Medina | |
| 2016/0186973 A1 | 6/2016 | Chien | |
| 2018/0145469 A1* | 5/2018 | Chung | H01R 13/703 |
| 2019/0110119 A1 | 4/2019 | Yoshino et al. | |
| 2019/0257869 A1 | 8/2019 | Lee et al. | |
| 2020/0403433 A1* | 12/2020 | Chung | H02J 7/00045 |

FOREIGN PATENT DOCUMENTS

| | | |
|---|---|---|
| KR | 10-2018-0056218 | 5/2018 |
| KR | 10-2018-0124876 | 11/2018 |
| WO | WO 2012-027452 | 3/2012 |

OTHER PUBLICATIONS

PCT/ISA/237 Written Opinion issued on PCT/KR2019/016223, dated Mar. 6, 2020, pp. 6.
Korean Office Action dated Feb. 13, 2023 issued in counterpart application No. 10-2018-0147407, 13 pages.

* cited by examiner

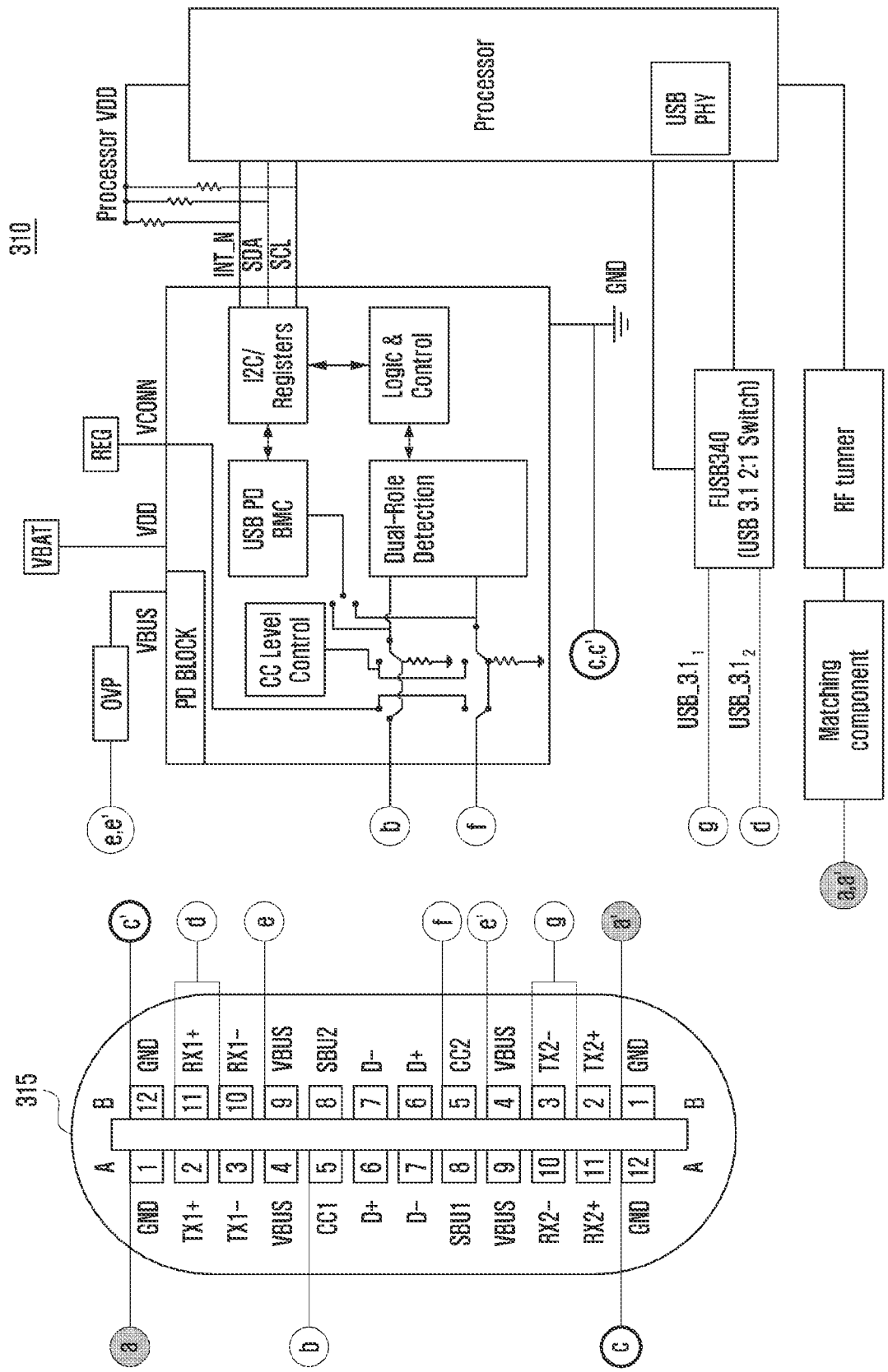

ELECTRONIC APPARATUS FOR SUPPORTING HIGH-SPEED CHARGING AND AUDIO SIGNAL TRANSMISSION/RECEPTION FUNCTIONS

PRIORITY

This application is a National Phase Entry of PCT International Application No. PCT/KR2019/016223 which was filed on Nov. 25, 2019, and claims priority to Korean Patent Application No. 10-2018-0147407, which was filed on Nov. 26, 2018, the content of each of which is incorporated herein by reference.

TECHNICAL FIELD

Various embodiments of the present disclosure relate to an electronic apparatus supporting high-speed charging and the transmission and reception of audio signals, an accessory device, and a method using the same.

BACKGROUND ART

Recently, with the development of the electronic communication industry, portable electronic apparatuses are rapidly increasing. For example, such a portable electronic apparatus may include various electronic apparatuses which can be freely used while moving without being limited to a place, such as personal digital assistants (PDA), a smart phone, a tablet PC, an MP3 player, a laptop personal computer (PC), a digital camera and a wearable device in addition to a mobile communication terminal for communication.

The electronic apparatus may include ports (e.g., connection terminals) for enabling an external electronic apparatus to be connected through wires. The ports may be standardized according to various standards. A universal serial bus (USB) method is most widely used among the various standards. The universal serial bus (hereinafter USB) is an input and output standard method used to connect the electronic apparatus and the external electronic apparatus, and availability thereof is gradually increasing.

DISCLOSURE OF INVENTION

Technical Problem

In an electronic apparatus, in order to satisfy a standard condition for a USB type C, connection information of an external device needs to be determined through the first CC pin and second CC pin of a port. For example, in a port that satisfies the standard condition for the USB type C, the first CC pin and second CC pin of the port may determine whether an external device is a device supporting high-speed charging or may determine whether an external device is a device supporting audio signal output. However, in this case, although the electronic apparatus is connected to the external device supporting high-speed charging, there may be a problem in that a high-speed charging function cannot be used while outputting an audio signal.

Solution to Problem

An electronic apparatus according to various embodiments includes a receptacle including a plurality of GND pins, a first CC pin, and a second CC pin, wherein a plug having a first USB type is insertable into the receptacle, and at least one processor. The at least one processor may be configured to determine whether an external device has been connected and whether the external device supports high-speed charging by using at least one of the first CC pin and the second CC pin, determine whether the external device supports audio signal output by using at least one of the plurality of GND pins based on the determination that the external device supports high-speed charging, and transmit and receive at least one of data or power to and from the external device based on whether the external device supports high-speed charging and supports audio signal output.

A method of transmitting and receiving, by an electronic apparatus, data or power according to various embodiments may include determining, by at least one processor, whether an accessory device has been connected by using at least one of a first CC pin and a second CC pin included in a receptacle of the electronic apparatus, determining, by the at least one processor, whether the accessory device supports high-speed charging by using at least one of the first CC pin and the second CC pin, determining, by the at least one processor, whether the accessory device supports audio signal output by using at least one of a plurality of GND pins included in the receptacle based on the determination that the accessory device supports high-speed charging, and controlling, by the at least one processor, at least one of data or power to be transmitted and received through the accessory device based on whether the high-speed charging is supported and whether the audio signal output is supported.

An accessory device according to various embodiments includes a first plug having a first USB type and including a plurality of GND pins, a first receptacle into which a specific plug having the first USB type is insertable, and an analog audio jack including a DET1 terminal. The DET1 terminal may be configured to be connected to at least one of the plurality of GND pins.

Advantageous Effects of Invention

The electronic apparatus according to various embodiments can provide a further improved feeling of use by simultaneously supporting a high-speed charging function and an audio signal output function, for example, by enabling a user to charge the electronic apparatus at high speed and also to listen to music or watch video.

BRIEF DESCRIPTION OF DRAWINGS

FIG. 4 is a diagram illustrated to describe a method of identifying the connection of an external device in the electronic apparatus 310 according to various embodiments of the present disclosure.

MODE FOR THE INVENTION

Figure 1:
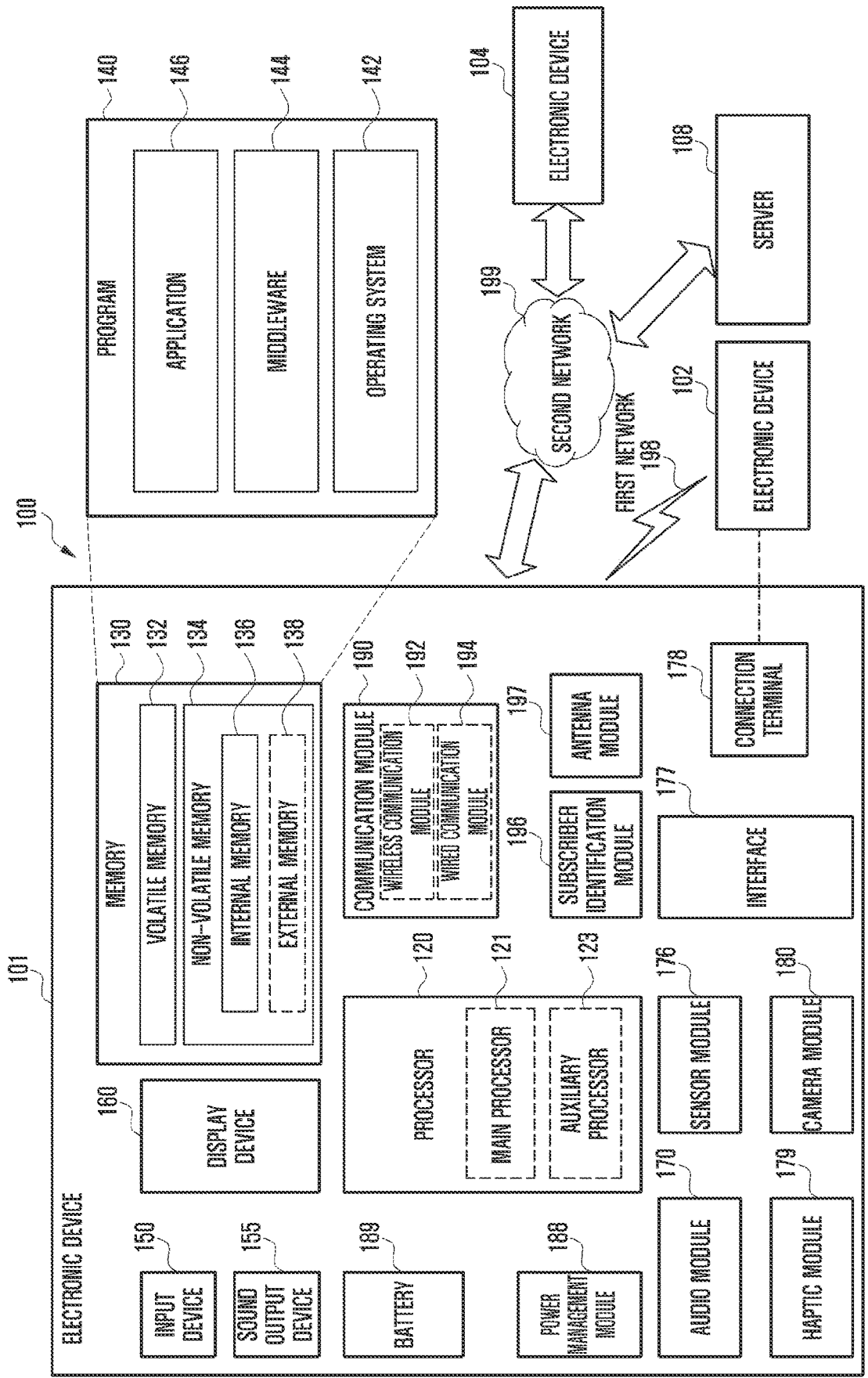
FIG. 1 is a block diagram of an electronic apparatus 101 within a network environment 100 according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
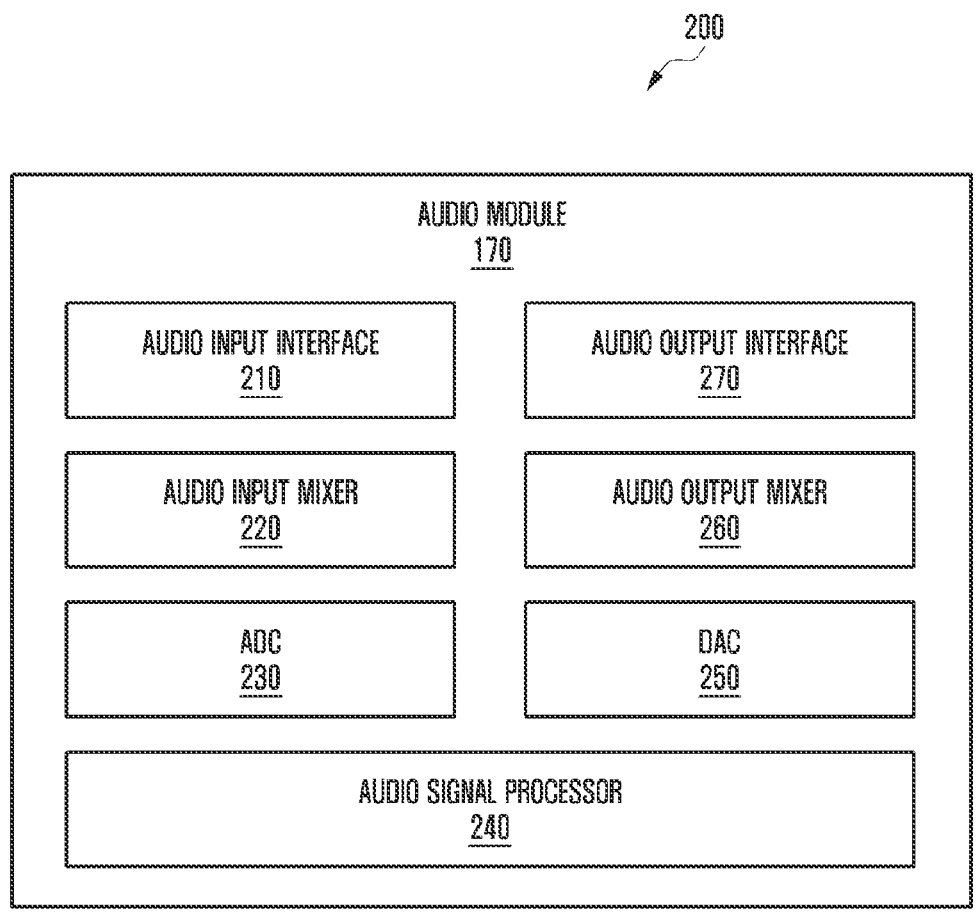
FIG. 2 is a block diagram 200 of an audio module 170 according to various embodiments.

FIG. 2 is a block diagram 200 illustrating the audio module 170 according to various embodiments. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via, a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into al least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3A:
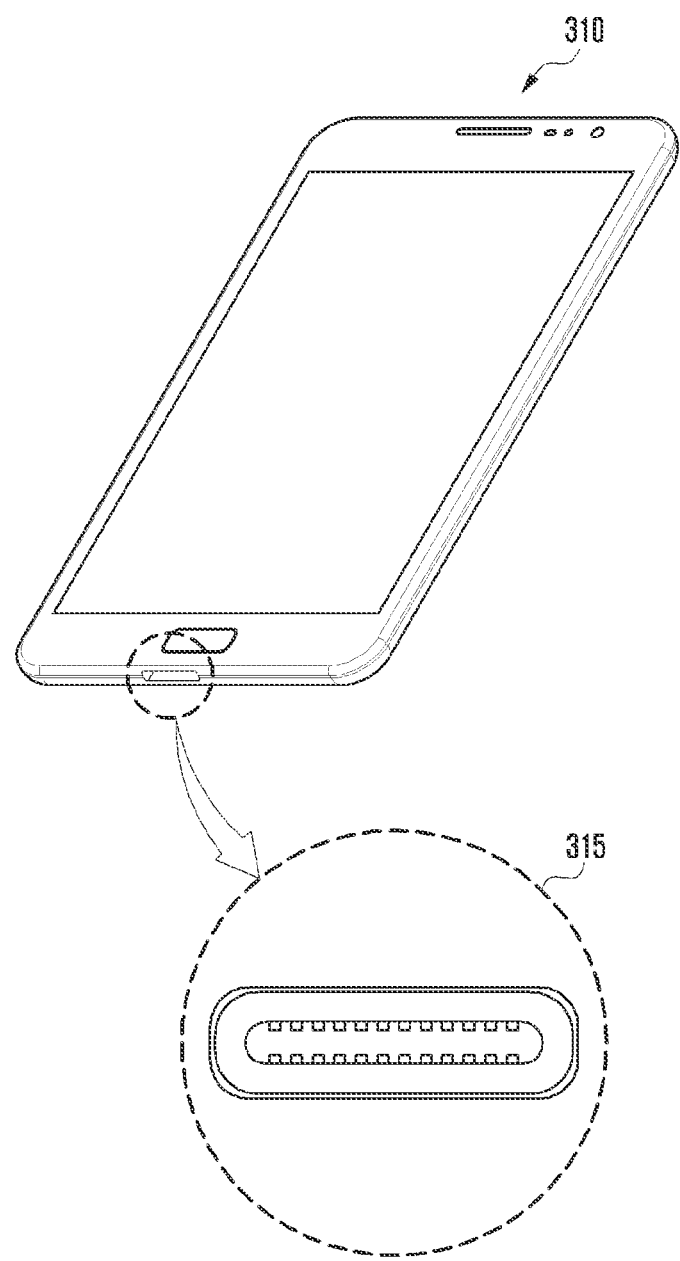
FIG. 3A is a diagram illustrating a receptacle 315 of an electronic apparatus 310 according to an embodiment of the present disclosure.

FIG. 3A is a diagram illustrating a receptacle 315 of an electronic apparatus 310 according to an embodiment of the present disclosure.

According to various embodiments, the electronic apparatus 310 (e.g., the electronic apparatus 101 in FIG. 1) may include the receptacle 315 (e.g., the interface 177 in FIG. 1) supporting a connection with an external device. For example, the electronic apparatus 310 may be connected to the external device as a connector of the external device is inserted into the receptacle 315 of the electronic apparatus 310.

For example, the receptacle 315 may be formed through an opening formed in one surface of the housing the electronic apparatus 310 and a hole extended from the opening. For example, a connector including a plurality of pins may be disposed within the hole of the receptacle 315.

The electronic apparatus 310 according to various embodiments may include the receptacle 315 in one surface at the bottom of the electronic apparatus 310 as illustrated in FIG. 3A, but a location where the receptacle 315 is disposed is not limited. The receptacle 315 may be disposed in another surface of the electronic apparatus 310.

According to various embodiments, the receptacle 315 may be a first USB type. For example, the electronic apparatus 310 may be connected to an external device including a plug having the first USB type. For example, the first USB type may include a USB type C.

According to various embodiments, an external device connected through the receptacle 315 may include an audio output device (e.g., a headset, an earphone or a speaker).

According to an embodiment, the audio output device may include a plug having the first USB type, and may be connected to the electronic apparatus as the plug having the first USB type is inserted into the receptacle 315 of the electronic apparatus 310. According to another embodiment of the present disclosure, the audio output device may be connected to the electronic apparatus 310 through an adapter, including the plug having the first USB type and an audio jack instead of the plug having the first USB type. For example, the audio output device and the electronic apparatus 310 may be interconnected as an analog audio plug (e.g., 3.5 mm analog audio plug) of the audio output device is inserted into the audio jack of the adapter and the first USB type plug of the adapter is inserted into the receptacle 350 of the electronic apparatus 310. The electronic apparatus 310 may transmit an audio signal to the audio output device or receive an audio signal from the audio output device by using at least some of the plurality of pins included in the receptacle 315.

According to another embodiment, an external device connected through the receptacle 315 may include a charging device capable of supplying power to the electronic apparatus 310 or being supplied with power from the electronic apparatus 310. For example, the electronic apparatus 310 may be connected to the charging device through the receptacle 315 having the first USB type (e.g., the USB type C), and may perform high-speed charging or normal charging.

According to another embodiment, an external device connected to the electronic apparatus 310 through the receptacle 315 may include a device including a memory capable of storing data. The electronic apparatus 310 may transmit and receive data to and from the external device.

Figure 3B:
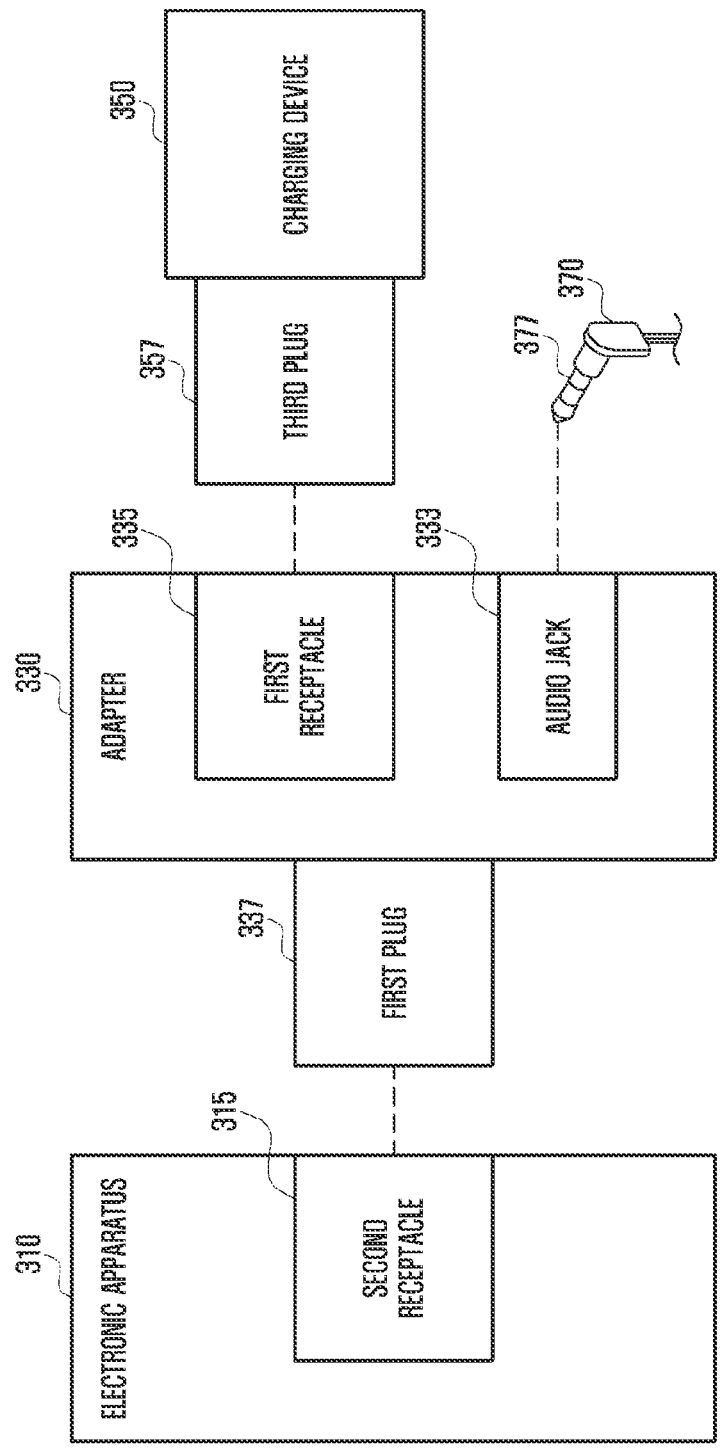
FIG. 3B is a diagram illustrating the electronic apparatus 310 connected to a plurality of external devices 350 and 370 through an adapter 330 according to various embodiments of the present disclosure.
Figure 3C:
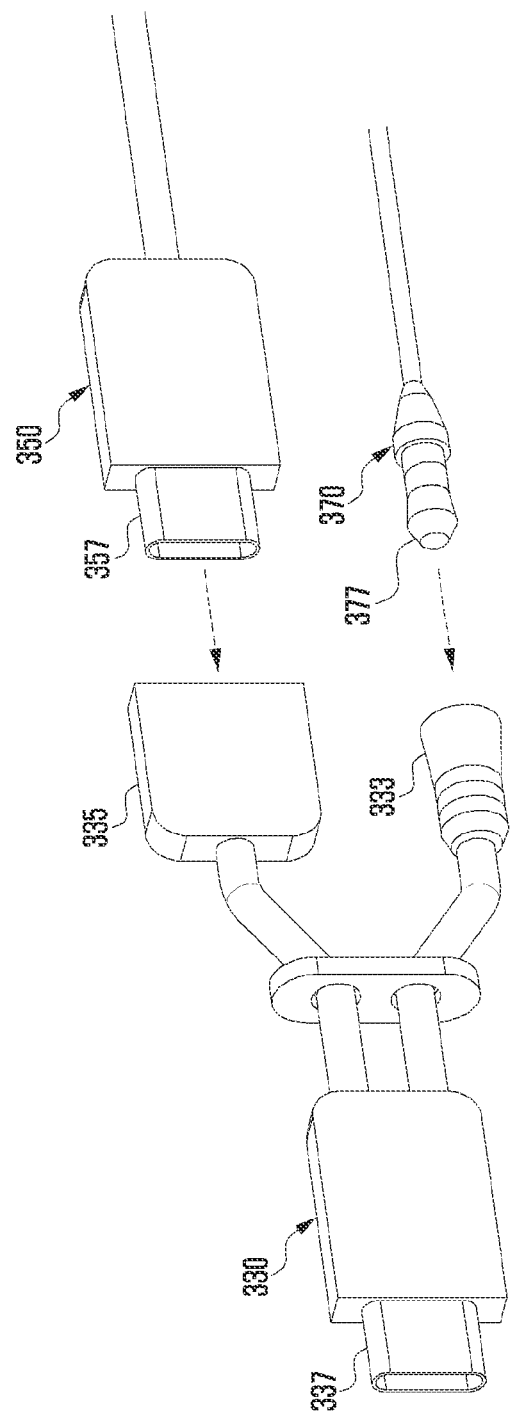
FIG. 3C is a diagram illustrating the plurality of external devices 350 and 370 and the adapter 330 according to an embodiment of the present disclosure.

FIG. 3B is a diagram illustrating the electronic apparatus 310 connected to a plurality of external devices 350 and 370 through an adapter 330 according to various embodiments of the present disclosure. FIG. 3C is a diagram illustrating the plurality of external devices 350 and 370 and the adapter 330 according to an embodiment of the present disclosure.

Referring to FIGS. 3B and 3C, the electronic apparatus 310 according to various embodiments may be simultaneously connected to a plurality of external devices through a receptacle 315 (e.g., the receptacle 315 in FIG. 3A) (hereinafter a second receptacle 315). For example, the electronic apparatus 310 may be simultaneously connected to the plurality of external devices by using the adapter 330, including an audio jack 333, a first receptacle 335 having the first USB type, and a first plug 337 having the first USB type.

The adapter 330 may be connected to the charging device 350 as the third plug 357 having the first USB type, of the charging device 350, is inserted into the first receptacle 335 having the first USB type, for example. Furthermore, the adapter 330 may be connected to an audio output device 370 as an audio plug 377 (e.g., a 3.5 mm analog audio plug) of the audio output device 370 is inserted into the audio jack 333 (e.g., a 3.5 mm analog audio jack). The electronic apparatus 310 may be connected to the charging device 350 and the audio charging device 370 connected thereto through the adapter 330 as a first plug 337 of the adapter 330 is inserted into the second receptacle 315 having the first USB type.

For example, each of the first plug 337 of the adapter 330, the second receptacle 315 of the electronic apparatus 310, the first receptacle 335 of the adapter 330, and the third plug 357 of the charging device 350 may satisfy a standard condition for the USB type C.

According to various embodiments, the first plug 337 having the first USB type (e.g., the USB type C) may include a plurality of GND pins, a CC pin, and a VCONN pin. The audio jack 333 (e.g., a 3.5 mm analog audio jack) may include a DET1 terminal. For example, the DET1 terminal of the audio jack 333 may be connected to at least one of a plurality of pins of the first plug 337.

According to various embodiments of the present disclosure, the DET1 terminal of the audio jack 333 may be connected to at least some of the plurality of GND pins of the first plug 337.

For example, when the adapter 330 is connected to the electronic apparatus 310, one or more GND pins of the first plug 337 connected to the DET1 terminal of the audio jack 333 may be connected to at least some of a plurality of GND pins included in the second receptacle 315. For example, the electronic apparatus 310 may determine whether a specific signal is detected from the plurality of GND pins of the second receptacle 315, and may identify a connection with the audio output device 370 based on the detection of the signal.

For example, in the adapter 330, the first receptacle 335 having the first USB type (e.g., the USB type C) may include a first CC pin and a second CC pin.

According to various embodiments, the adapter 330 may be configured so that the first CC pin or second CC pin of the first receptacle 335 is connected to the CC pin or VCONN pin of the first plug 337. For example, the first CC pin or second CC pin of the first receptacle 335 may be connected to a first CC pin or second CC pin of the second receptacle 315 through the CC pin or VCONN pin of the first plug. For example, the electronic apparatus 310 may identify a connection with the charging device 350 by using at least one of the first CC pin and second CC pin of the second receptacle 315.

Although not illustrated, the adapter 330 according to various embodiments may further include an antenna line on a cable that connects the audio jack 333 and the first plug 337. For example, the antenna line may be configured to connect the DET1 terminal of the audio jack 333 and at least one of the plurality of GND pins of the first plug 337. For example, the antenna line may be electrically connected to at least some of the plurality of CND pins of the second receptacle 315 by using at least some of the plurality of GND pins of the first plug 337. For example, the electronic apparatus 310 may identify whether a specific radio frequency (RF) signal is received by using the antenna line through at least one of the plurality of GND pins of the second receptacle 315.

The adapter 330 according to various embodiments may further include an audio processing unit on the cable that connects the audio jack 333 and the first plug 337. For example, the audio processing unit may convert, into an analog audio signal, a digital audio signal received through the first plug 337, and may process the audio signal so that the audio signal is transmitted through the audio jack 333.

FIG. 4 is a diagram illustrated to describe a method of identifying the connection of an external device in the electronic apparatus 310 according to various embodiments of the present disclosure.

Referring to FIG. 4, the electronic apparatus 310 according to various embodiments may identify the connection of an external device by using the plurality of pins included in the second receptacle 315 having the first USB type (e.g., the USB type C), and may transmit and receive at least one of data or power to and from the external device.

For example, the electronic apparatus 310 may detect a specific signal from the plurality of pins of the second receptacle 315 by using at least one processor (e.g., the processor 120 (e.g., an application processor) in FIG. 1 or a power delivery (PD) control block).

According to various embodiments, the second receptacle 315 that satisfies the standard condition for the USB type C may include the plurality of pins, including the first CC pin A5, the second CC pin B5, and the plurality of GND pins A1, A12, B1, and B12.

For example, the at least one processor of the electronic apparatus 310 may determine whether an external device (e.g., the charging device 350 or the audio output device 370 in FIG. 3B) has been connected to the second receptacle 315 through a circuit connected to at least one of the first CC pin A5 and second CC pin B5 of the second receptacle 315. For example, the at least one processor of the electronic apparatus 310 may determine at least whether the external device has been connected and the type of external device, based on a signal detected from at least one of the first CC pin A5 and the second CC pin B5.

For example, the at least one processor of the electronic apparatus 310 may determine at least one of whether the external device has been connected, whether the connected external device supports high-speed charging or normal charging, and whether the connected external device supports audio signal output, through a line b connected to the first CC pin A5 and a line f connected to the second CC pin B5.

For example, the at least one processor of the electronic apparatus 310 may determine Whether the external device supports audio signal output through a circuit connected to at least one of the plurality of GND pins A1, A12, B1, and B12 of the second receptacle 315.

For example, the electronic apparatus 310 may determine whether the external device supports audio signal output in a pull-up/pull-down way by determining a resistance value detected through at least one of a line a or a line a' connected to at least one of the plurality of GND pins A1, A12, B1, and B12.

Furthermore, for example, the electronic apparatus 310 may determine whether an RF signal is detected through at least one of the line a or the line a' connected to at least one of the plurality of GND pins A1, A12, B1, and B12, and may determine whether the external device supports audio signal output based on whether the RF signal is detected.

For example, the at least one processor of the electronic apparatus 310 may determine whether an RF signal is received from at least one of the line a or the line a' based on a request for the execution of a designated application in the electronic apparatus 310. When receiving the RF signal, the at least one processor of the electronic apparatus 310 may perform impedance matching on the RF signal by using a matching circuit configuration (e.g., a matching component or an RF tuner) for the impedance matching.

According to various embodiments, the at least one processor of the electronic apparatus 310 may determine whether the external device supports audio signal output by using at least one of D+pins A6 and B6 and D−pins A7 and B7 included in the second receptacle 315. For example, when determining that a digital signal is received from the external device through at least one of the D+pins A6 and B6 and the D−pins A7 and B7, the at least one processor may determine that the external device supports audio signal output and the external device also corresponds to a device including an audio processing unit. For example, when determining that a digital signal is not received through at least one of the D+pins A6 and B6 and the D−pins A7 and B7, the electronic apparatus 310 may determine whether the external device supports audio signal output by determining whether a signal is received through at least one of the plurality of GND pins A1, A12, B1, and B12.

According to various embodiments, the at least one processor of the electronic apparatus 310 may transmit and receive at least one of data or power to and from the connected external device based on a result of the determination. For example, the at least one processor of the electronic apparatus 310 may control data to be transmitted and received to and from the external device through at least one of a line d or a line g connected to at least one of a plurality of RX pins A10, A11, B10, and B11 and a plurality of TX pins A2, A3, B2, and B3 of the second receptacle 315. For example, the at least one processor of the electronic apparatus 310 may control power to be transmitted and received to and from the external device through at least one of a line e or a line e' connected to at least one of a plurality of VBUSs A4, A9, B4, and B9 of the second receptacle 315. For example, the at least one processor may transmit and receive power to and from the external device according to a designated condition through the line e or the line e', based on whether the connected external device supports high-speed charging or normal charging through at least one of the line b or the line f.

Figure 5:
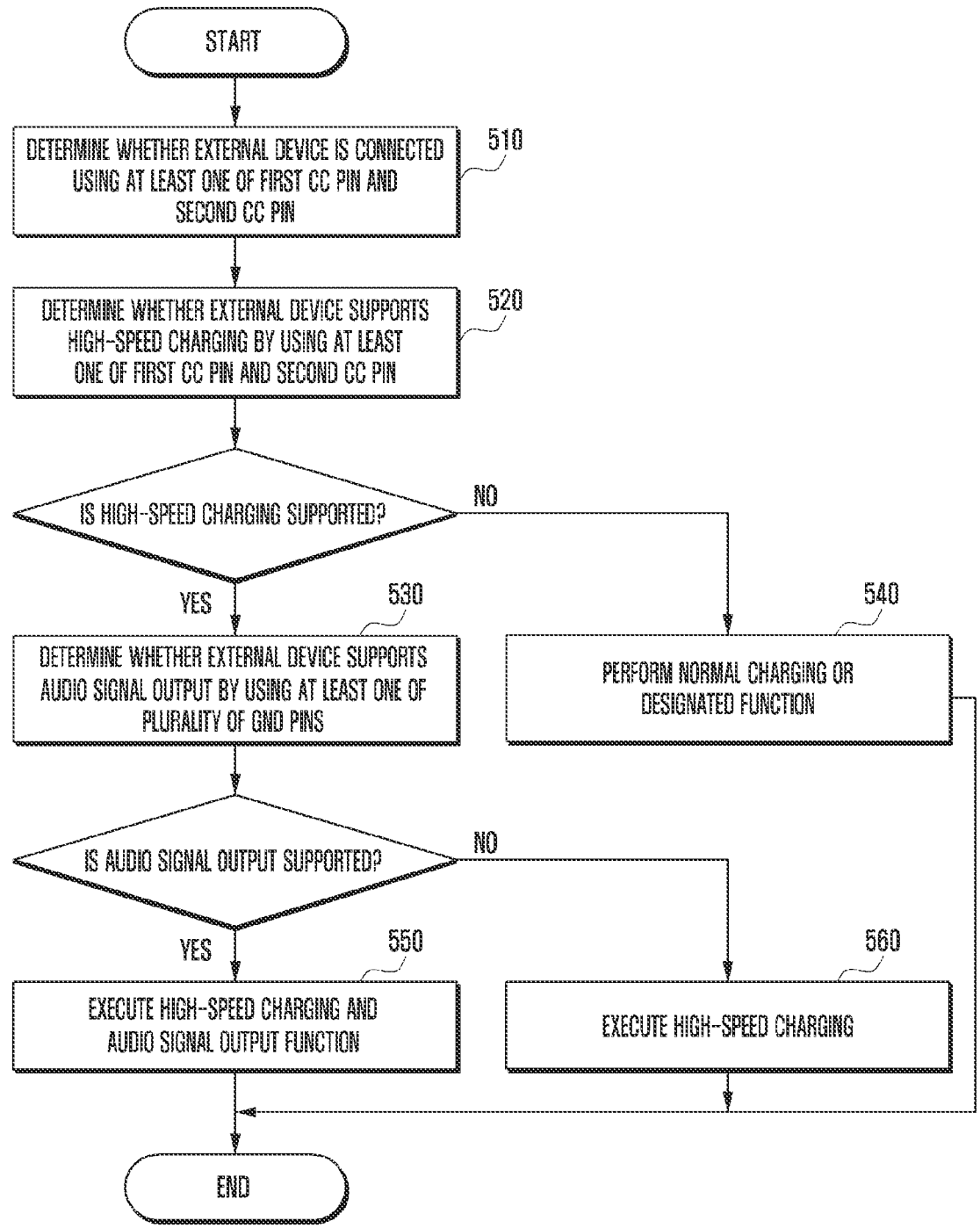
FIG. 5 is a flowchart for describing a method of transmitting and receiving data and/or power to and from an external device in the electronic apparatus 310 according to various embodiments of the present disclosure.

FIG. 5 is a flowchart for describing a method of transmitting and receiving data and/or power to and from an external device in the electronic apparatus 310 according to various embodiments of the present disclosure.

Referring to FIG. 5, at operation 510, the electronic apparatus 310 according to various embodiments may determine, by at least one processor, whether an external device (e.g., an external accessory device) is connected using at least one of the first CC pin and the second CC pin included in the second receptacle 315 of the electronic apparatus 310. For example, the external device may include one or more external devices 350 and 370 capable of transmitting and receiving at least one of data or power to and from the electronic apparatus 310. The one or more external devices 350 and 370 may be directly connected to the electronic apparatus 310 or may be connected to the electronic apparatus 310 through the adapter 330.

At operation 520, the electronic apparatus 310 according to various embodiments may determine whether the connected external device supports high-speed charging by using at least one of the first CC pin and the second CC pin.

At operation 540, when determining that the external device does not support high-speed charging at operation 520, the electronic apparatus 310 according to various embodiments may perform a designated function through the external device based on the type of external device determined using at least one of the first CC pin and the second CC pin. For example, the electronic apparatus 310 may transmit and receive power so that the external device performs normal charging based on a supported charging condition, or may transmit and receive data to and from the external device.

At operation 530, when determining that the external device supports high-speed charging at operation 520, the electronic apparatus 310 according to various embodiments may determine whether the external device supports audio signal output by using at least one of the plurality of GND pins.

For example, when determining that the external device does not support audio signal output as a result of the determination using at least one of the plurality of GND pins, the electronic apparatus 310 may control power to be transmitted and received to and from the external device under a high-speed charging condition at operation 560.

For example, when determining that the external device supports audio signal output at operation 530, the electronic apparatus 310 may control power to be transmitted and received to and from the external device under the high-speed charging condition and simultaneously control audio signals to be transmitted and received to and from the external device at operation 550. For example, the electronic apparatus 310 may determine whether the external device has been connected and whether the connected external device supports high-speed charging by using at least one of the first CC pin and the second CC pin. When determining that high-speed charging is supported, the electronic apparatus may determine whether the connected external device supports audio signal output by using at least one of the plurality of GND pins. For example, when determining that the external device supports high-speed charging and supports audio signal output, the electronic apparatus 310 may execute high-speed charging through the external device. When determining that the external device supports high-speed charging, but does not support audio signal output, the electronic apparatus 310 may execute only a high-speed charging function.

Although not illustrated, according to various embodiments, the electronic apparatus 310 may further include an operation of determining whether an RF signal is received based on a request for the execution of a designated application. For example, when a specific application that requires the reception of an RF signal is executed, the electronic apparatus 310 may determine whether the RF signal is received by using at least one of the plurality of GND pins. For example, when receiving the RF signal, the electronic apparatus 310 may transmit, to the external device, data related to the application. When the RF signal is not received, the electronic apparatus 310 may control notification, requesting the insertion of an antenna accessory device, to be output to the outside by using a display device (e.g., the display device 160 in FIG. 1) of the electronic apparatus.

The electronic apparatus 310 according to various embodiments may determine whether an external device connected thereto is a device supporting audio signal output by determining whether an RF signal is received by using at least one of the plurality of GND pins regardless of the execution of a designated application.

Although not illustrated, the electronic apparatus 310 according to another embodiment may determine whether an external device supports audio signal output by using at least one of the D+pins and D−pins of the second receptacle 315. For example, when determining that a digital signal is received from the external device through at least one of the D+pins and the D−pins, the electronic apparatus may determine that the external device is a device supporting audio signal output and the external device is a device including an audio processing unit capable of converting an analog audio signal into a digital audio signal. For example, when determining that a digital signal is not received through at least one of the D+pin and the D−pin, the electronic apparatus 310 may determine whether the external device supports audio signal output by additionally determining whether a specific signal is received through at least one of the plurality of GND pins.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic apparatus comprising:
a receptacle comprising a plurality of GND pins, a first CC pin, a second CC pin, a D+pin and a D−pin, wherein a plug having a first universal serial bus (USB) type is insertable into the receptacle; and
at least one processor,
wherein the at least one processor is configured to:
when an external device is connected to the receptacle, determine whether the external device supports high-speed charging by using at least one of the first CC pin and the second CC pin,
identify whether a first signal is received from the external device using at least one of the D+pin and the D−pin based on the determination that the external device supports high-speed charging,
identify whether a second signal is received from the external device using at least one of the plurality of GND pins, if the first signal is not received through the at least one of the D+pin and the D−pin,
determine whether the external device supports audio signal output based on the determination that the first signal is received through the at least one of the D+pin and the D−pin or the second signal is received through the plurality of GND pins, and
transmit and receive at least one of data or power to and from the external device based on whether the external device supports high-speed charging and supports audio signal output.

2. The electronic apparatus of claim 1, wherein the at least one processor is configured to:
identify whether a radio frequency (RF) signal is received from the external device by using at least one of the plurality of GND pins, and
transmit and receive at least one of data or power to and from the external device based on the reception of the RF signal.

3. The electronic apparatus of claim 2, wherein the at least one processor is configured to:
identify whether the RF signal is received from the external device by using at least one of the plurality of GND pins based on whether an execution of a designated application in the electronic apparatus is requested, and
transmit and receive at least one of data or power to and from the external device based on the reception of the RF signal.

4. The electronic apparatus of claim 2, wherein the at least one processor is configured to output notification, requesting an insertion of an antenna accessory device, through a display device of the electronic apparatus when an RF signal is not received from the external device.

5. The electronic apparatus of claim 1, wherein the at least one processor is configured to receive power from the external device by using at least one of a plurality of VBUS pins included in the receptacle based on the determination that the external device supports high-speed charging.

6. The electronic apparatus of claim 1, wherein the external device comprises an accessory device comprising a first plug having the first USB type and an analog audio jack.

7. The electronic apparatus of claim 1, wherein the first USB type comprises a USB type C.

8. A method of transmitting and receiving, by an electronic apparatus, data and power, comprising:
determining, by at least one processor, whether an accessory device has been connected by using at least one of a first CC pin and a second CC pin included in a receptacle of the electronic apparatus;
determining, by the at least one processor, whether the accessory device supports high-speed charging by using at least one of the first CC pin and the second CC pin;
identifying, by the at least one processor, whether a first signal is received from the accessory device using at least one of a D+pin and a D−pin included in the receptacle based on the determination that the accessory device supports high-speed charging,
identifying, by the at least one processor, whether a second signal is received from the accessory device using at least one of a plurality of GND pins included in the receptacle, if the first signal is not received through the at least one of the D+pin and the D−pin,
determining, by the at least one processor, whether the accessory device supports audio signal output based on the determination that the first signal is received through the at least one of the D+pin and the D−pin or the second signal is received through the plurality of GND pins; and
controlling, by the at least one processor, at least one of data or power to be transmitted and received through the accessory device based on whether the high-speed charging is supported and whether the audio signal output is supported.

9. The method of claim 8, further comprising:
identifying, by the at least one processor, whether an RF signal is received from the accessory device by using at least one of the plurality of GND pins; and
transmitting and receiving data to and from the accessory device based on the RF signal.

10. The method of claim 9, wherein identifying whether the RF signal is received is performed based on whether an execution of a designated application in the electronic apparatus is requested.

11. The method of claim 9, further comprising outputting notification, requesting an insertion of an antenna accessory device, through a display device of the electronic apparatus when an RF signal is not received.

12. The method of claim 8, further comprising receiving power from the accessory device by using at least one of a plurality of VBUS pins included in the receptacle based on the determination that the accessory device supports high-speed charging.

13. The method of claim 8, wherein the accessory device comprises a first plug having a first universal serial bus (USB) type and an analog audio jack.

14. The method of claim 8, wherein the first USB type comprises a USB type C.

15. An accessory device comprising:
a first plug having a first universal serial bus (USB) type and comprising a plurality of GND pins;
a first receptacle into which a specific plug having the first USB type is insertable;
an analog audio jack comprising a DET1 terminal, and
an antenna line on a cable connecting the analog audio jack and the first plug,
wherein the DET1 terminal is configured to be connected to at least one of the plurality of GND pins, and
wherein the antenna line is configured to connect the DET1 terminal and at least one of the plurality of GND pins.

16. The accessory device of claim 15, further comprising an audio processing unit on a cable connecting the analog audio jack and the first plug,
    wherein the audio processing unit is configured to convert, into an analog audio signal, a digital audio signal received through the first plug and to transmit the analog audio signal through the analog audio jack.

17. The accessory device of claim 15, wherein the first USB type comprises a USB type C.

\* \* \* \* \*